UNITED STATES PATENT OFFICE.

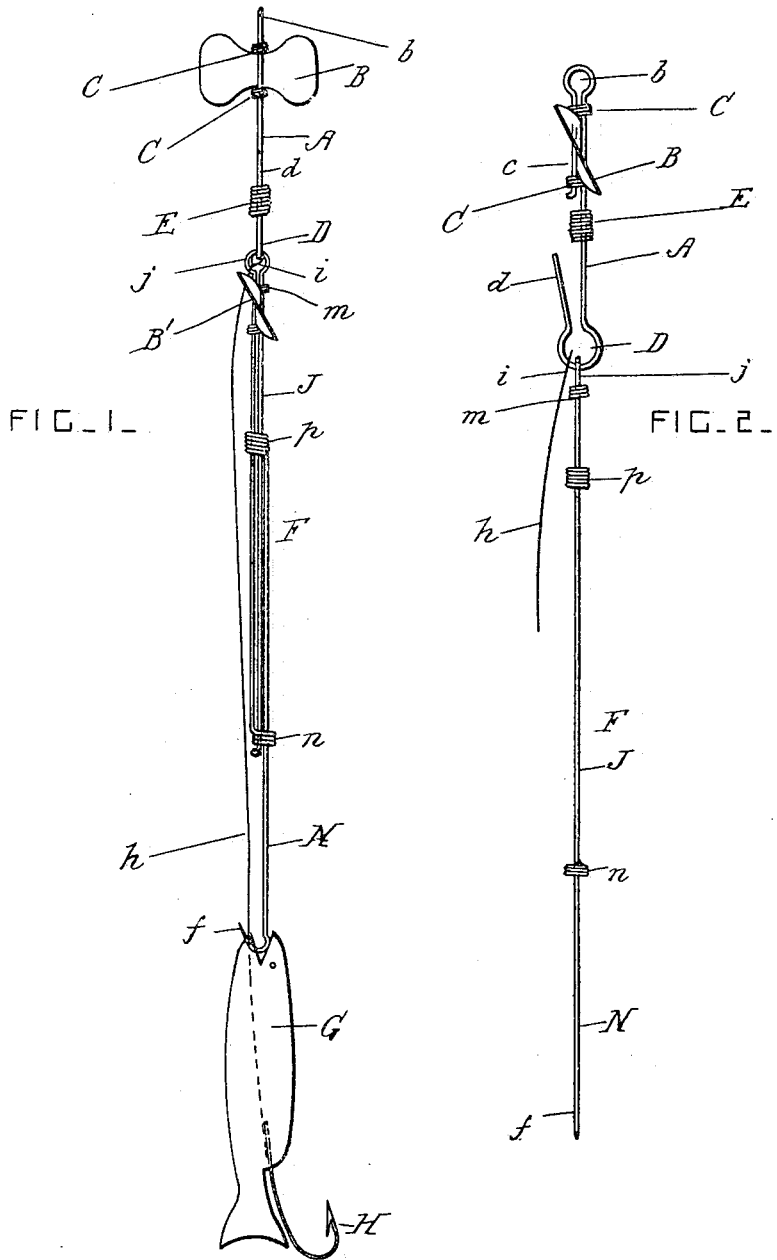

THADDEUS S. COFFIN, OF REVERE, MASSACHUSETTS.

BAIT-HOLDER.

No. 801,649.          Specification of Letters Patent.          Patented Oct. 10, 1905.

Application filed March 8, 1905. Serial No. 249,030.

*To all whom it may concern:*

Be it known that I, THADDEUS S. COFFIN, a citizen of the United States, residing at Revere, in the county of Suffolk and State of Massachusetts, have invented certain new and useful Improvements in Bait-Holders; and I do hereby declare the following to be a full, clear, and exact description of the invention, such as will enable others skilled in the art to which it appertains to make and use the same.

This invention relates to bait-holders for use in fishing; and it consists in the novel construction and combination of the parts hereinafter fully described and claimed.

In the drawings, Figure 1 is a side view of the bait-holder. Fig. 2 is a side view of the propeller and telescopic support turned one-quarter around from the position shown in Fig. 1 and shown broken and to a larger scale and with the loop of the propeller-shaft unclasped.

A is the propeller-shaft, provided with propeller-blades B. The propeller-shaft has a loop $b$ at its top, which is connected with the line by a swivel of any improved construction. The propeller-blades are formed of a single piece of sheet metal, which is placed between the main portion of the shaft A and the part $c$ at the other end of the loop $b$.

C represents two bands which encircle the parts A and $c$ above and below the propeller-blades and which hold the propeller-blades securely in position. These bands are preferably coils of thin wire.

The lower end of the shaft A is provided with a loop D, and $d$ is an end portion of the loop D, which is arranged parallel with the main portion of the shaft A.

E is a slidable band which normally holds the parts A and $d$ coupled together, as shown in Fig. 1. The band E is preferably formed of coils of fine wire and when slid upward, as shown in Fig. 2, the telescopic support and the guts can be placed in engagement with the loop D.

F is a telescopic support for the bait which is provided with a hook $f$ at its lower end.

G is the bait, which consists, preferably, of a small fish or a representation of some small fish, such as a minnow.

The telescopic support is placed in engagement with the loop D of the propeller-shaft, and its hook $f$ engages with the bait and supports it. The support F is made telescopic, so that the bait can be arranged at various distances from the propeller and adjusted to suit various requirements.

H is a fishing-hook, and $h$ is the gut or other similar flexible connection which is attached to the shank of the fishing-hook and which has a loop $i$ at its upper end, which is placed in engagement with the loop D of the propeller-shaft. The fishing-hook is arranged to project at the lower part of the bait, and its gut passes through the bait. As many fishing-hooks and guts as desired can be arranged and attached in this manner in carrying out this invention according to requirements and the size of the bait used; but only one fishing-hook and gut is shown in the drawings for clearness.

The main portion of the telescopic support is formed of two parallel rods or wires J, which form a loop $j$ at their upper ends. This loop $j$ is placed in engagement with the loop D of the propeller-shaft. A band $m$ is arranged around the rods close below the loop $j$, and, if desired, a second propeller B' may be attached at this point, as shown in Fig. 1; but this propeller B' is not a necessary element of the present invention. The lower end portion of one of the two rods J is coiled into a band $n$, which encircles the end portion of the other rod and which forms a guide for the lower portion N of the telescopic support. The portion N is a single rod, and its upper end portion is coiled into a band $p$, which encircles the two rods J and which is slidable upon them. The two portions of the telescopic support are slid by hand and are held in any desired position by frictional contact between them, the coiled wires of the said bands or guides having a degree of resilience which enables the parts to be adjusted with facility and to stay in any desired position after being adjusted.

What I claim is—

1. The combination, with a shaft and means for revolving it, of a bait, a telescopic support connecting the said bait with the said shaft, and a fishing-hook also engaging with the said bait and provided with a flexible connection which is attached to the said shaft.

2. The combination, with a shaft and means for revolving it, of a bait, a telescopic support formed of two members which are held in engagement with each other by frictional contact and which connect the said bait with the said shaft, and a fishing-hook which also engages with the said bait and which is provided with a flexible connection for attaching it to the said shaft.

3. The combination, with a shaft having a loop at its lower end, a slidable band for holding the said loop closed, and a propeller secured to the said shaft; of a bait, a support between the said bait and loop, and a fishing-hook also engaging with the said bait and provided with a flexible connection which is attached to the said loop.

4. The combination, with a shaft and means for revolving it, of a bait, a telescopic support comprising two members the upper member of which comprises two parallel rods which are connected to the said shaft and the lower member comprising a single rod which engages with the bait and which has a band at its upper end which slides over the said upper member, and a fishing-hook which also engages with the said bait and which is provided with a flexible connection for attaching it to the said shaft.

5. The combination, with a telescopic bait-holder comprising a lower and slidable member provided with means for supporting a bait, and an upper member provided with means for connecting it with a fishing-line; of a flexible connection having a fishing-hook for engaging with the bait at its lower end and means for connecting it with the fishing-line at its upper end, and means for revolving the said bait-holder and flexible connection.

In testimony whereof I have affixed my signature in the presence of two witnesses.

THADDEUS S. COFFIN.

Witnesses:
EDWARD K. PARKER,
ABBIE F. COFFIN.